US009390143B2

(12) United States Patent
McDonnell et al.

(10) Patent No.: US 9,390,143 B2
(45) Date of Patent: *Jul. 12, 2016

(54) RECENT INTEREST BASED RELEVANCE SCORING

(71) Applicant: Google Inc., Mountain View, CA (US)

(72) Inventors: Philip A. McDonnell, San Francisco, CA (US); Glen M. Jeh, San Francisco, CA (US); Taher H. Haveliwala, Fremont, CA (US); Yair Kurzion, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/602,609

(22) Filed: Jan. 22, 2015

(65) Prior Publication Data
US 2015/0199361 A1 Jul. 16, 2015

Related U.S. Application Data

(63) Continuation of application No. 12/572,739, filed on Oct. 2, 2009, now Pat. No. 8,972,391.

(51) Int. Cl.
*G06F 17/30* (2006.01)
*H04L 29/08* (2006.01)

(52) U.S. Cl.
CPC ...... *G06F 17/3053* (2013.01); *G06F 17/30702* (2013.01); *G06F 17/30867* (2013.01); *H04L 67/10* (2013.01)

(58) Field of Classification Search
CPC .......... G06F 17/3053; G06F 17/30702; G06F 17/30867; H04L 67/10
See application file for complete search history.

(56) References Cited

U.S. PATENT DOCUMENTS

| 5,265,065 A | 11/1993 | Turtle |
| 5,488,725 A | 1/1996 | Turtle |

(Continued)

FOREIGN PATENT DOCUMENTS

| WO | WO 00/77689 | 12/2000 |
| WO | WO 01/16807 | 3/2001 |

(Continued)

OTHER PUBLICATIONS

"Dynamic Adaptation Strategies for Long-Term and Short-Term User Profile," by Li et al. IN: LNCS 4505 pp. 228-240 (2007). Available at: Springer.*

(Continued)

*Primary Examiner* — Daniel Kinsaul
(74) *Attorney, Agent, or Firm* — Fish & Richardson P.C.

(57) ABSTRACT

A computer-implemented method for processing query information includes receiving prior queries followed by a current query, the prior and current queries being received within an activity period an originating with a search requester. The method also includes receiving a plurality of search results based on the current query. Each search result identifying a search result document, each respective search result document being associated with a query specific score indicating a relevance of the document to the current query. The method also includes determining a first category based, at least in part, on the prior queries. The method also includes identifying a plurality of prior activity periods of other search requesters, each prior activity period containing a prior activity query where the prior activity query matches the current query, and where the prior activity period indicates the same first category.

15 Claims, 7 Drawing Sheets

(56) References Cited

U.S. PATENT DOCUMENTS

| | | |
|---|---|---|
| 5,696,962 A | 12/1997 | Kupiec |
| 5,920,854 A | 7/1999 | Kirsch et al. |
| 5,963,940 A | 10/1999 | Liddy et al. |
| 6,006,222 A | 12/1999 | Culliss |
| 6,006,225 A | 12/1999 | Bowman et al. |
| 6,014,665 A | 1/2000 | Culliss |
| 6,026,388 A | 2/2000 | Liddy et al. |
| 6,067,565 A | 5/2000 | Horvitz |
| 6,076,051 A | 6/2000 | Messerly et al. |
| 6,078,916 A | 6/2000 | Culliss |
| 6,078,917 A | 6/2000 | Paulsen et al. |
| 6,088,692 A | 7/2000 | Driscoll |
| 6,134,532 A | 10/2000 | Lazarus et al. |
| 6,182,066 B1 | 1/2001 | Marques et al. |
| 6,182,068 B1 | 1/2001 | Culliss |
| 6,185,559 B1 | 2/2001 | Brin et al. |
| 6,249,252 B1 | 6/2001 | Dupray |
| 6,269,368 B1 | 7/2001 | Diamond |
| 6,285,999 B1 | 9/2001 | Page |
| 6,321,228 B1 | 11/2001 | Crandall et al. |
| 6,327,590 B1 | 12/2001 | Chidlovskii et al. |
| 6,334,132 B1 | 12/2001 | Weeks et al. |
| 6,341,283 B1 | 1/2002 | Yamakawa et al. |
| 6,353,849 B1 | 3/2002 | Linsk |
| 6,363,378 B1 | 3/2002 | Conklin et al. |
| 6,370,526 B1 | 4/2002 | Agrawal et al. |
| 6,421,675 B1 | 7/2002 | Ryan et al. |
| 6,473,752 B1 | 10/2002 | Fleming, III |
| 6,480,843 B2 | 11/2002 | Li |
| 6,490,575 B1 | 12/2002 | Berstis |
| 6,526,440 B1 | 2/2003 | Bharat |
| 6,529,903 B2 | 3/2003 | Smith et al. |
| 6,539,377 B1 | 3/2003 | Culliss |
| 6,560,590 B1 | 5/2003 | Shwe et al. |
| 6,567,103 B1 | 5/2003 | Chaudhry |
| 6,587,848 B1 | 7/2003 | Aggarwal et al. |
| 6,615,209 B1 | 9/2003 | Gomes |
| 6,623,529 B1 | 9/2003 | Lakritz |
| 6,640,218 B1 | 10/2003 | Golding et al. |
| 6,658,423 B1 | 12/2003 | Pugh et al. |
| 6,671,681 B1 | 12/2003 | Emens et al. |
| 6,678,681 B1 | 1/2004 | Brin et al. |
| 6,701,309 B1 | 3/2004 | Beeferman et al. |
| 6,725,259 B1 | 4/2004 | Bharat |
| 6,738,764 B2 | 5/2004 | Mao et al. |
| 6,754,873 B1 | 6/2004 | Law et al. |
| 6,792,416 B2 | 9/2004 | Soetarman et al. |
| 6,795,820 B2 | 9/2004 | Barnett |
| 6,816,850 B2 | 11/2004 | Culliss |
| 6,853,993 B2 | 2/2005 | Ortega et al. |
| 6,873,982 B1 | 3/2005 | Bates et al. |
| 6,877,002 B2 | 4/2005 | Prince |
| 6,882,999 B2 | 4/2005 | Cohen et al. |
| 6,901,402 B1 | 5/2005 | Corston-Oliver et al. |
| 6,912,505 B2 | 6/2005 | Linden et al. |
| 6,944,611 B2 | 9/2005 | Flank et al. |
| 6,944,612 B2 | 9/2005 | Roustant et al. |
| 6,954,750 B2 | 10/2005 | Bradford |
| 6,963,867 B2 | 11/2005 | Ford et al. |
| 6,990,453 B2 | 1/2006 | Wang et al. |
| 7,016,939 B1 | 3/2006 | Rothwell et al. |
| 7,028,027 B1 | 4/2006 | Zha et al. |
| 7,072,886 B2 | 7/2006 | Salmenkaita et al. |
| 7,085,761 B2 | 8/2006 | Shibata |
| 7,113,939 B2 | 9/2006 | Chou et al. |
| 7,117,206 B1 | 10/2006 | Bharat et al. |
| 7,136,849 B2 | 11/2006 | Patrick |
| 7,146,361 B2 | 12/2006 | Broder et al. |
| 7,222,127 B1 | 5/2007 | Bem et al. |
| 7,231,399 B1 | 6/2007 | Bem et al. |
| 7,243,102 B1 | 7/2007 | Naam et al. |
| 7,249,126 B1 | 7/2007 | Ginsburg et al. |
| 7,266,765 B2 | 9/2007 | Golovchinsky et al. |
| 7,293,016 B1 | 11/2007 | Shakib et al. |
| 7,379,951 B2 | 5/2008 | Chkodrov et al. |
| 7,382,358 B2 | 6/2008 | Kushler et al. |
| 7,395,222 B1 | 7/2008 | Sotos |
| 7,426,507 B1 | 9/2008 | Patterson |
| 7,451,487 B2 | 11/2008 | Oliver et al. |
| 7,499,919 B2 | 3/2009 | Meyerzon et al. |
| 7,505,964 B2 | 3/2009 | Tong et al. |
| 7,516,146 B2 | 4/2009 | Robertson et al. |
| 7,526,470 B1 | 4/2009 | Karnawat et al. |
| 7,533,092 B2 | 5/2009 | Berkhin et al. |
| 7,533,130 B2 | 5/2009 | Narayana et al. |
| 7,552,112 B2 | 6/2009 | Jhala et al. |
| 7,565,363 B2 | 7/2009 | Anwar |
| 7,565,367 B2 | 7/2009 | Barrett et al. |
| 7,566,363 B2 | 7/2009 | Starling et al. |
| 7,574,530 B2 | 8/2009 | Wang et al. |
| 7,584,181 B2 | 9/2009 | Zeng et al. |
| 7,603,350 B1 | 10/2009 | Guha |
| 7,610,282 B1 | 10/2009 | Datar et al. |
| 7,636,714 B1 | 12/2009 | Lamping et al. |
| 7,657,626 B1 | 2/2010 | Zwicky |
| 7,676,507 B2 | 3/2010 | Maim |
| 7,680,775 B2 | 3/2010 | Levin et al. |
| 7,693,818 B2 | 4/2010 | Majumder |
| 7,716,225 B1 | 5/2010 | Dean et al. |
| 7,747,612 B2 | 6/2010 | Thun et al. |
| 7,756,887 B1 | 7/2010 | Haveliwala |
| 7,769,740 B2 | 8/2010 | Martinez et al. |
| 7,783,632 B2 | 8/2010 | Richardson et al. |
| 7,792,833 B2 | 9/2010 | Meyerzon |
| 7,801,885 B1 | 9/2010 | Verma |
| 7,809,716 B2 | 10/2010 | Wang et al. |
| 7,818,315 B2 | 10/2010 | Cucerzan et al. |
| 7,818,320 B2 | 10/2010 | Makeev |
| 7,836,058 B2 | 11/2010 | Chellapilla |
| 7,844,589 B2 | 11/2010 | Wang et al. |
| 7,849,089 B2 | 12/2010 | Zhang et al. |
| 7,853,557 B2 | 12/2010 | Schneider et al. |
| 7,856,446 B2 | 12/2010 | Brave et al. |
| 7,860,886 B2 | 12/2010 | Loftesness |
| 7,877,404 B2 | 1/2011 | Achan et al. |
| 7,895,177 B2 | 2/2011 | Wu |
| 7,925,498 B1 | 4/2011 | Baker et al. |
| 7,925,649 B2 | 4/2011 | Jeh et al. |
| 7,953,740 B1 | 5/2011 | Vadon et al. |
| 7,974,974 B2 | 7/2011 | Tankovich et al. |
| 7,987,185 B1 | 7/2011 | Mysen et al. |
| 8,001,136 B1 | 8/2011 | Papachristou et al. |
| 8,019,650 B2 | 9/2011 | Donsbach et al. |
| 8,024,326 B2 | 9/2011 | Tong et al. |
| 8,024,330 B1 | 9/2011 | Franco et al. |
| 8,027,439 B2 | 9/2011 | Zoldi et al. |
| 8,037,042 B2 | 10/2011 | Anderson et al. |
| 8,037,043 B2 | 10/2011 | Zoeter et al. |
| 8,037,086 B1 | 10/2011 | Upstill et al. |
| 8,051,061 B2 | 11/2011 | Niu et al. |
| 8,060,456 B2 | 11/2011 | Gao et al. |
| 8,060,497 B1 | 11/2011 | Zatsman et al. |
| 8,065,296 B1 | 11/2011 | Franz et al. |
| 8,069,182 B2 | 11/2011 | Pieper |
| 8,073,263 B2 | 12/2011 | Hull et al. |
| 8,073,772 B2 | 12/2011 | Bishop et al. |
| 8,073,867 B2 | 12/2011 | Chowdhury |
| 8,082,242 B1 | 12/2011 | Mysen et al. |
| 8,086,599 B1 | 12/2011 | Heymans |
| 8,086,690 B1 | 12/2011 | Heymans |
| 8,090,717 B1 | 1/2012 | Bharat et al. |
| 8,126,839 B2 | 2/2012 | Chen et al. |
| 8,156,111 B2 | 4/2012 | Jones et al. |
| 8,171,041 B2 | 5/2012 | Bennett |
| 8,224,827 B2 | 7/2012 | Dean et al. |
| 8,239,370 B2 | 8/2012 | Wong et al. |
| 8,352,466 B2 | 1/2013 | Jones |
| 8,396,865 B1 | 3/2013 | Ie et al. |
| 8,412,699 B1 | 4/2013 | Mukherjee et al. |
| 8,447,760 B1 | 5/2013 | Tong et al. |
| 8,458,165 B2 | 6/2013 | Liao et al. |
| 8,498,974 B1 | 7/2013 | Kim et al. |
| 8,521,725 B1 | 8/2013 | Pearson et al. |
| 8,583,636 B1 | 11/2013 | Franz et al. |

(56) References Cited

U.S. PATENT DOCUMENTS

| | | |
|---|---|---|
| 8,615,514 B1 | 12/2013 | Fernandes et al. |
| 8,661,012 B1 | 2/2014 | Baker et al. |
| 8,661,029 B1 | 2/2014 | Kim et al. |
| 8,694,374 B1 | 4/2014 | Diligenti et al. |
| 8,694,511 B1 | 4/2014 | Corduneanu et al. |
| 8,738,596 B1 | 5/2014 | Kim et al. |
| 8,832,083 B1 | 9/2014 | Chen et al. |
| 8,874,555 B1 | 10/2014 | Kim et al. |
| 8,898,150 B1 | 11/2014 | Kuramochi et al. |
| 8,898,152 B1 | 11/2014 | Ie et al. |
| 8,898,153 B1 | 11/2014 | Kim et al. |
| 8,909,655 B1 | 12/2014 | McDonnell |
| 8,924,379 B1 | 12/2014 | Kim et al. |
| 8,938,463 B1 | 1/2015 | Kim et al. |
| 2001/0000356 A1 | 4/2001 | Woods |
| 2002/0034292 A1 | 3/2002 | Tuoriniemi et al. |
| 2002/0042791 A1 | 4/2002 | Smith et al. |
| 2002/0049752 A1 | 4/2002 | Bowman et al. |
| 2002/0103790 A1 | 8/2002 | Wang et al. |
| 2002/0123988 A1 | 9/2002 | Dean et al. |
| 2002/0133481 A1 | 9/2002 | Smith et al. |
| 2002/0165849 A1 | 11/2002 | Singh et al. |
| 2003/0009399 A1 | 1/2003 | Boerner |
| 2003/0018707 A1 | 1/2003 | Flocken |
| 2003/0028529 A1 | 2/2003 | Cheung et al. |
| 2003/0037074 A1 | 2/2003 | Dwork et al. |
| 2003/0078914 A1 | 4/2003 | Witbrock |
| 2003/0120654 A1 | 6/2003 | Edlund et al. |
| 2003/0135490 A1 | 7/2003 | Barrett et al. |
| 2003/0149704 A1 | 8/2003 | Yayoi et al. |
| 2003/0167252 A1 | 9/2003 | Odom et al. |
| 2003/0187837 A1 | 10/2003 | Culliss |
| 2003/0195877 A1 | 10/2003 | Ford et al. |
| 2003/0204495 A1 | 10/2003 | Lehnert |
| 2003/0220913 A1 | 11/2003 | Doganata et al. |
| 2003/0229640 A1 | 12/2003 | Carlson et al. |
| 2004/0006456 A1 | 1/2004 | Loofbourrow |
| 2004/0006740 A1 | 1/2004 | Krohn et al. |
| 2004/0034632 A1 | 2/2004 | Carmel et al. |
| 2004/0049486 A1 | 3/2004 | Scanlon et al. |
| 2004/0059708 A1 | 3/2004 | Dean et al. |
| 2004/0083205 A1 | 4/2004 | Yeager |
| 2004/0093325 A1 | 5/2004 | Banerjee et al. |
| 2004/0119740 A1 | 6/2004 | Chang et al. |
| 2004/0122811 A1 | 6/2004 | Page |
| 2004/0153472 A1 | 8/2004 | Rieffanaugh, Jr. |
| 2004/0158560 A1 | 8/2004 | Wen et al. |
| 2004/0186828 A1 | 9/2004 | Yadav |
| 2004/0186996 A1 | 9/2004 | Gibbs et al. |
| 2004/0199419 A1 | 10/2004 | Kim et al. |
| 2004/0215607 A1 | 10/2004 | Travis, Jr. |
| 2005/0015366 A1 | 1/2005 | Carrasco et al. |
| 2005/0021397 A1 | 1/2005 | Cui et al. |
| 2005/0027691 A1 | 2/2005 | Brin et al. |
| 2005/0033803 A1 | 2/2005 | Vleet et al. |
| 2005/0050014 A1 | 3/2005 | Gosse et al. |
| 2005/0050027 A1 | 3/2005 | Yeh |
| 2005/0055342 A1 | 3/2005 | Bharat et al. |
| 2005/0055345 A1 | 3/2005 | Ripley |
| 2005/0060290 A1 | 3/2005 | Herscovici et al. |
| 2005/0060310 A1 | 3/2005 | Tong et al. |
| 2005/0060311 A1 | 3/2005 | Tong et al. |
| 2005/0071741 A1 | 3/2005 | Acharya et al. |
| 2005/0102282 A1 | 5/2005 | Linden |
| 2005/0125376 A1 | 6/2005 | Curtis et al. |
| 2005/0160083 A1 | 7/2005 | Robinson |
| 2005/0192946 A1 | 9/2005 | Lu et al. |
| 2005/0198026 A1 | 9/2005 | Dehlinger et al. |
| 2005/0222987 A1 | 10/2005 | Vadon |
| 2005/0222998 A1 | 10/2005 | Driessen et al. |
| 2005/0240576 A1 | 10/2005 | Piscitello et al. |
| 2005/0240580 A1 | 10/2005 | Zamir et al. |
| 2005/0256848 A1 | 11/2005 | Alpert et al. |
| 2006/0036593 A1 | 2/2006 | Dean et al. |
| 2006/0047643 A1 | 3/2006 | Chaman |
| 2006/0069667 A1 | 3/2006 | Manasse et al. |
| 2006/0074903 A1 | 4/2006 | Meyerzon et al. |
| 2006/0089926 A1 | 4/2006 | Knepper et al. |
| 2006/0095421 A1 | 5/2006 | Nagai et al. |
| 2006/0106793 A1 | 5/2006 | Liang |
| 2006/0123014 A1 | 6/2006 | Ng |
| 2006/0173830 A1 | 8/2006 | Smyth et al. |
| 2006/0195443 A1 | 8/2006 | Franklin et al. |
| 2006/0200476 A1 | 9/2006 | Gottumukkala et al. |
| 2006/0200556 A1 | 9/2006 | Brave et al. |
| 2006/0227992 A1 | 10/2006 | Rathus et al. |
| 2006/0230040 A1 | 10/2006 | Curtis et al. |
| 2006/0259476 A1 | 11/2006 | Kadayam et al. |
| 2006/0293950 A1 | 12/2006 | Meek et al. |
| 2006/0294060 A1 | 12/2006 | Masuyama |
| 2007/0005575 A1 | 1/2007 | Dai et al. |
| 2007/0005588 A1 | 1/2007 | Zhang et al. |
| 2007/0016553 A1* | 1/2007 | Dumais ............ H04L 12/5885 |
| 2007/0038659 A1 | 2/2007 | Datar et al. |
| 2007/0050339 A1 | 3/2007 | Kasperski et al. |
| 2007/0061195 A1 | 3/2007 | Liu et al. |
| 2007/0061211 A1 | 3/2007 | Ramer et al. |
| 2007/0081197 A1 | 4/2007 | Omoigui |
| 2007/0106659 A1 | 5/2007 | Lu et al. |
| 2007/0112730 A1 | 5/2007 | Gulli et al. |
| 2007/0130370 A1 | 6/2007 | Akaezuwa |
| 2007/0156677 A1 | 7/2007 | Szabo |
| 2007/0172155 A1 | 7/2007 | Guckenberger |
| 2007/0180355 A1 | 8/2007 | McCall et al. |
| 2007/0192190 A1 | 8/2007 | Granville |
| 2007/0208730 A1 | 9/2007 | Agichtein et al. |
| 2007/0214131 A1 | 9/2007 | Cucerzan et al. |
| 2007/0233653 A1 | 10/2007 | Biggs et al. |
| 2007/0233671 A1* | 10/2007 | Oztekin ............ G06F 17/30867 |
| 2007/0255689 A1 | 11/2007 | Sun et al. |
| 2007/0260596 A1 | 11/2007 | Koran et al. |
| 2007/0260597 A1 | 11/2007 | Cramer et al. |
| 2007/0260624 A1* | 11/2007 | Chung ................ G06Q 30/02 |
| 2007/0266021 A1 | 11/2007 | Aravamudan et al. |
| 2007/0266439 A1 | 11/2007 | Kraft |
| 2007/0288450 A1 | 12/2007 | Datta et al. |
| 2008/0010143 A1 | 1/2008 | Kniaz et al. |
| 2008/0027913 A1 | 1/2008 | Chang et al. |
| 2008/0052219 A1 | 2/2008 | Sandholm et al. |
| 2008/0052273 A1 | 2/2008 | Pickens |
| 2008/0059453 A1 | 3/2008 | Laderman |
| 2008/0077570 A1 | 3/2008 | Tang et al. |
| 2008/0082518 A1 | 4/2008 | Loftesness |
| 2008/0091650 A1 | 4/2008 | Fontoura et al. |
| 2008/0104043 A1 | 5/2008 | Garg et al. |
| 2008/0114624 A1 | 5/2008 | Kitts |
| 2008/0114729 A1 | 5/2008 | Raman et al. |
| 2008/0114750 A1 | 5/2008 | Saxena et al. |
| 2008/0140699 A1 | 6/2008 | Jones et al. |
| 2008/0162475 A1 | 7/2008 | Meggs et al. |
| 2008/0183660 A1 | 7/2008 | Szulczewski |
| 2008/0189269 A1 | 8/2008 | Olsen |
| 2008/0208825 A1 | 8/2008 | Curtis et al. |
| 2008/0228442 A1 | 9/2008 | Lippincott et al. |
| 2008/0256050 A1 | 10/2008 | Zhang et al. |
| 2008/0313168 A1 | 12/2008 | Liu et al. |
| 2008/0313247 A1 | 12/2008 | Galvin |
| 2009/0006438 A1 | 1/2009 | Tunkelang et al. |
| 2009/0012969 A1 | 1/2009 | Rail et al. |
| 2009/0055392 A1 | 2/2009 | Gupta et al. |
| 2009/0070194 A1 | 3/2009 | Song |
| 2009/0089657 A1 | 4/2009 | Davis et al. |
| 2009/0094073 A1 | 4/2009 | Cheung et al. |
| 2009/0157643 A1 | 6/2009 | Gollapudi et al. |
| 2009/0171943 A1 | 7/2009 | Majumder et al. |
| 2009/0182723 A1 | 7/2009 | Shnitko et al. |
| 2009/0187557 A1 | 7/2009 | Hansen et al. |
| 2009/0228442 A1 | 9/2009 | Adams et al. |
| 2009/0287656 A1 | 11/2009 | Bennett |
| 2009/0313242 A1 | 12/2009 | Kodama |
| 2010/0106706 A1 | 4/2010 | Rorex et al. |
| 2010/0131563 A1 | 5/2010 | Yin |
| 2010/0161591 A1 | 6/2010 | Jones et al. |
| 2010/0205541 A1 | 8/2010 | Rapaport et al. |

(56) References Cited

U.S. PATENT DOCUMENTS

| | | | |
|---|---|---|---|
| 2010/0228738 A1 | 9/2010 | Mehta et al. |
| 2010/0241472 A1 | 9/2010 | Hernandez |
| 2010/0299317 A1 | 11/2010 | Uy |
| 2010/0325131 A1 | 12/2010 | Dumais et al. |
| 2011/0029517 A1 | 2/2011 | Ji et al. |
| 2011/0064795 A1 | 3/2011 | Tosi et al. |
| 2011/0087656 A1 | 4/2011 | Oh et al. |
| 2011/0087966 A1 | 4/2011 | Leviathan et al. |
| 2011/0179093 A1 | 7/2011 | Pike et al. |
| 2011/0219025 A1 | 9/2011 | Lipson et al. |
| 2011/0264670 A1 | 10/2011 | Banerjee et al. |
| 2011/0282906 A1 | 11/2011 | Wong |
| 2011/0295844 A1 | 12/2011 | Sun et al. |
| 2011/0295879 A1 | 12/2011 | Logis et al. |
| 2012/0011148 A1 | 1/2012 | Rathus et al. |
| 2012/0191705 A1 | 7/2012 | Tong et al. |

FOREIGN PATENT DOCUMENTS

| WO | WO 01/67297 | 9/2001 |
|---|---|---|
| WO | WO 2004/059514 | 7/2004 |

OTHER PUBLICATIONS

"An Adaptive Algorithm for Learning Changes in User Interests," by Widyantoro et al. IN: CIKM'99 (1999). Available at: ACM.*
Soumen Chakrabarti, et al. "Enhanced Topic Distillation using Text, Markup tags, and Hyperlinks" ACM, Sep. 9-12, 2001, pp. 208-216.
Agichtein, et al; *Improving Web Search Ranking by Incorporating User Behavior Information*; Aug. 2006; Proceedings of the Twenty-Ninth Annual International ACM SIGIR Conference on Research and Development in Information Retrieval, p. 19-26.
Agichtein, et al; *Learning User Interaction Models for Predicting Web Search Result Performances*; Aug. 2006; Proceedings of the Twenty-Ninth Annual International ACM SIGIR Conference on Research and Development in Information Retrieval, p. 3-10.
Gabriel Somlo et al., "Using Web Hepler Agent Profiles in Query Generation", ACM, Jul. 2003, pp. 812-818.
Bar-Llan et al., "Presentation Bias is Significant in Determining User Preference for Search Results—A User Study"; Journal of the American Society for Information Science and Technology, vol. 60, Issue 1 (p. 135-149), Sep. 2008, 15 pages.
Bar-Llan et al.; ""Methods for comparing rankings of search engine results""; Computer Networks: The International Journal of Computer and Telecommunications Networking, Jul. 2006, vol. 50, Issue 10, 19 pages.
Boldi, et al.; *The Query-flow Graph: Model and Applications; CKIM '08*, Oct. 26-30, Napa Valley, California, USA, pp. 609-617.
Boyan et al.; *A Machine Learning Architecture for Optimizing Web Search Engines*; Aug. 1996; Internet-based information systems—Workshop Technical Report—American Association for Artificial Intelligence, p. 1-8.
Burke, Robin, Integrating Knowledge-based and Collaborative-filtering Recommender Systems, AAAI Technical Report WS-99-01. Compilation copyright © 1999, AAAI (www.aaai.org), pp. 69-72.
Craswell, et al.; *Random Walks on the Click Graph*; Jul. 2007; SIGIR '07, Amsterdam, the Netherlands, 8 pages.
Cutrell, et al.; *Eye tracking in MSN Search: Investigating snippet length, target position and task types*; 2007; Conference on Human Factors in Computing Systems—Proceedings of the SIGCHI Conference on Human Factors in Computing Systems.
Diligenti, et al., *Users, Queries and Documents: A Unified Representation for Web Mining*, wi-iat, vol. 1, 2009 IEEE/WIC/ACM International Joint Conference on Web Intelligence and Intelligent Agent Technology, 2009, pp. 238-244.
Google News archive, Jul. 8, 2003, Webmasterworld.com, [online] Retrieved from the Internet http://www.webmasterwolrd.com/forum3/15085.htm [retrieved on Nov. 20, 2009] 3 pages.
Grčar, Miha, *User Profiling: Collaborative Filtering*, SIKDD 2004, Oct. 12-15, 2004, Ljubljana, Slovenia, 4 pages.

Hofmann, Thomas, *Latent Semantic Models for Collaborative Filtering*, ACM Transactions on Information Systems, vol. 22, No. 1, Jan. 2004, pp. 89-115.
Joachims et al., "Search Engines that Learn from Implicit Feedback"; Aug. 2007, IEEE Computer Society.
Joachims, T., Evaluating retrieval performance using clickthrough data. Proceedings of the SIGIR Workshop on Mathematical/Formal Methods in Information Retrieval; Aug. 12-15, 2002; Tampere, Finland, 18 pages.
Joachims; *Optimizing search engines using clickthrough data*; 2002; Proceedings of the ACM SIGKDD International Conference on Knowledge Discovery and Data Mining, p. 133-142.
Kelly, et al.; *Implicit Feedback for Inferring User Preference: A Bibliography*; SIGIR Forum, vol. 37, No. 2 (2003), pp. 18-28.
Lemire, Daniel, *Scale and Translation Invariant Collaborative Filtering Systems*, Published in Information Retrieval, 8(1), pp. 129-150, 2005.
Linden, Greg et al., *Amazon.com Recommendations: Item-to-Item Collaborative Filtering*, [online], http://computer.org/internet/, IEEE Internet Computing, Jan.-Feb. 2003, IEEE Computer Society, pp. 76-80.
U.S. Patent Office, U.S. Appl. No. 11/556,143, filed Nov. 2, 2006, in Office Action mailed Apr. 20, 2011, 18 pages.
U.S. Patent Office, U.S. Appl. No. 11/556,143, filed Nov. 2, 2006, in Office Action mailed Jan. 25, 2010, 14 pages.
U.S. Patent Office, U.S. Appl. No. 11/556,143, filed Nov. 2, 2006, in Office Action mailed Jul. 6, 2010, 20 pages.
U.S. Patent Office, U.S. Appl. No. 11/685,095, filed Mar. 12, 2007, in Office Action mailed Apr. 13, 2011, 31 pages.
U.S. Patent Office, U.S. Appl. No. 11/685,095, filed Mar. 12, 2007, in Office Action mailed Feb. 25, 2009, 21 pages.
U.S. Patent Office, U.S. Appl. No. 11/685,095, filed Mar. 12, 2007, in Office Action mailed Feb. 8, 2010, 31 pages.
U.S. Patent Office, U.S. Appl. No. 11/685,095, filed Mar. 12, 2007, in Office Action mailed Sep. 10, 2009, 23 pages.
Nicole, Kristen, Heeii is StumbleUpon Plus Google Suggestions, [online], Retrieved from the Internet http://mashable.com/2007/05/15/heeii/, 11 pages.
Radlinski, et al., *Query Chains: Learning to Rank from Implicit Feedback*, KDD '05, Aug. 21-24, 2005, Chicago, Illinois, USA, 10 pages.
U.S. Patent Office, U.S. Appl. No. 11/556,086, filed Nov. 2, 2006, in Office Action mailed Jun. 23, 2010, 21 pages.
Schwab, et al., *Adaptivity through Unobstrusive Learning*, 2002, 16(3), pp. 5-9.
Stoilova, Lubomira et al., *GiveALink: Mining a Semantic Network of Bookmarks for Web Search and Recommendation*, LinkKDD '05, Aug. 21, 2005, Chicago, IL, USA, 8 pages.
W3C, URIs, URLs and URNs: Classification and Recommendations 1.0, Report from the joint W3C/IETF URI Planning Interest Group, Sep. 21, 2001, 8 pages.
Xiao, et al., *Measuring Similarity of Interests for Clustering Web-Users*, ADC, 2001, pp. 107-114.
Xie et al., *Web User Clustering from Access Log Using Belief Function*, K-CAP '01, Oct. 22-23, 2001, Victoria, British Columbia, Canada, pp. 202-208.
Yu et al., *Selecting Relevant Instances for Efficient and Accurate Collaborative Filtering*, CIKM '01, Nov. 5-10, 2001, Atlanta, Georgia, pp. 239-246.
Zeng et al., *Similarity Measure and Instance Selection for Collaborative Filtering*, WWW '03, May 20-24, 2003, Budapest, Hungary, pp. 652-658.
Zeng, et al., "Learning to Cluster Web Search Results", SIGIR '04, Proceedings of the 27th Annual International ACM SIGIR conference on research and development in information retrieval, 2004.
Australian Patent Office Non-Final Office Action in AU App. Ser. No. 2004275274, mailed Feb. 3, 2010, 2 pages.
Dan Olsen et al., "Query-by-critique: Spoken Language Access to Large Lists", ACM, Oct. 2002, pp. 131-140.
Susan Gauch et al., "A Corpus Analysis Approach for Automatic Query Expansion and its Extension to Multiple Databases", ACM, Jul. 1999, pp. 250-269.

(56) References Cited

OTHER PUBLICATIONS

Nicolas Bruno et al., "Top-K Selection Queries over Relational Databases: Mapping Strategies and Performance Evaluation", ACM, Jun. 2002, pp. 153-187.

Ji-Rong Wen et al., "Query Clustering using User Logs", ACM, Jan. 2002, pp. 59-81.

Brin, S. and L. Page, The Anatomy of a Large-Scale Hypertextual Web Search Engine, Computer Science Department, Apr. 1998.

International Search Report and Written Opinion for Application No. PCT/US2004/029615, dated Jan. 19, 2005, 8 pages.

Hungarian Patent Office, International Search Report and Written Opinion for Application No. 200806756-3, dated Nov. 19, 2010 12 pages.

Authorized Officer Athina Nickitas-Etienne, International Preliminary Report and Written Opinion for Application No. PCT/US2004/029615, mailed Mar. 23, 2006.

Indian Office Action in Indian Application No. 686/KOLNP/2006, mailed Jun. 3, 2008, 2 pages.

Danish Search Report and Written Opinion for Application No. 200601630-7, dated Jun. 21, 2007, 15 pages.

Jones et al., "Pictures of Relevance: A Geometric Analysis of Similarity Measures", Journal of the American Society for Information Science, Nov. 1987, 23 pages.

Kaplan et al., "Adaptive Hypertext Navigation Based on User Goals and Context", User Modeling and User-Adapted Interaction 2, Sep. 1, 1993; pp. 193-220, 28 pages.

Liddy et al., "A Natural Language Text Retrieval System With Relevance Feedback", 16th National Online, May 2-6, 1995, 3 pages.

Baeza-Yates, Ricardo, Carlos Hurtado, and Marcelo Mendoza. "Query recommendation using query logs in search engines." Current Trends in Database Technology—EDBT 2004 Workshops. Springer Berlin Heidelberg, 2005.

Velez, Bienvenido, et al. "Fast and effective query refinement." ACM SIGIR Forum. vol. 31. No. SI. ACM, 1997.

Mandala, Rila, Takenobu Tokunaga, and Hozumi Tanaka. "Combining multiple evidence from different types of thesaurus for query expansion." Proceedings of the 22nd annual international ACM SIGIR conference on Research and development in information retrieval. ACM, 1999.

"Personalizing Search via Automated Analysis of Interests and Activities," by Teevan et al. IN: SIGIR'05 (2005), 8 pages.

Joachims, "Evaluating Search Engines Using Clickthrough Data", Cornell University, Department of Computer Science, Draft, Feb. 19, 2002, 13 pages.

Jansen et al., "An Analysis of Web Documents Retrieved and Viewed", School of Information Sciences and Technology, The Pennsylvania State University, the $4^{th}$ International Conference on Internet Computing, Las Vegas, Nevada, pp. 65-69, Jun. 23-26, 2003, 5 pages.

\* cited by examiner

RECENT INTEREST BASED RELEVANCE SCORING

CROSS-REFERENCE TO RELATED APPLICATIONS

This application is a continuation application of, and claims priority to, U.S. patent application Ser. No. 12/572,739, titled "Recent Interest Based Relevance Scoring," filed on Oct. 2, 2009. The disclosure of the foregoing application is incorporated herein by reference in its entirety for all purposes.

BACKGROUND

The present disclosure relates to using queries provided by one or multiple users to identify the intent of the user or users.

Internet search engines aim to identify documents or other items that are relevant to a user's queries and to present the documents or items in a manner that is most useful to the user. Such activity often involves a fair amount of inferring from various clues of what the user wants. Certain clues may be user specific. For example, knowledge that a user is making a request from a mobile device, and knowledge of the location of the device, can result in much better search results for such a user.

Clues about a user's needs may also be more general. For example, search results can have an elevated importance, or inferred relevance, if a number of other search results link to them. If the linking results are themselves highly relevant, then the linked-to results may have a particularly high relevance. Such an approach to determining relevance may be premised on the assumption that, if authors of web pages felt that another web site was relevant enough to be linked to, then web searchers would also find the site to be particularly relevant. In short, the web authors "vote up" the relevance of the sites.

Other various inputs may be used instead of, or in addition to, such techniques for determining and ranking search results. For example, user reactions to particular search results or search result lists may be gauged, so that results on which users often click will receive a higher ranking. The general assumption under such an approach is that searching users are often the best judges of relevance, so that if they select a particular search result, it is likely to be relevant, or at least more relevant than the presented alternatives.

SUMMARY

This specification describes technologies relating to ranking of resources for presentation in search results. In general, one or more aspects of the subject matter described in this specification can be embodied in one or more methods for processing query information. The methods include receiving prior queries followed by a current, the prior and current queries being received within an activity period and originating with a search requester. The methods include receiving a plurality of search results based on the current query, each search result identifying a search result document, each respective search result document being associated with a query specific score indicating a relevance of the document to the current query. The methods include determining a first category based, at least in part, on the prior queries. The methods include identifying a plurality of prior activity periods of other search requesters. Each prior activity period contains a prior activity query where the prior activity query matches the current query and where the prior activity period indicates the same first category. The methods include obtaining category based selection statistics of the other requesters search results based on the prior activity queries of the other activity periods. The methods include obtaining general selection statistics of a more general population of requesters based on the current query. The methods include generating adjusted scores for the search result documents by adjusting the respective scores based on the query specific score and the category specific score. The methods include ranking the search result documents according to the respective adjusted scores.

These and other embodiments can optionally include one or more of the following features:

Determining that the prior queries indicate the first category may also include analyzing time spent between selecting a first result and a second result. Generating may include determining a category specific selection frequency measuring the frequency with which the respective search result document is selected in the other activity periods, determining a general selection frequency measuring the frequency with which the respective search result document is selected by the more general population; and comparing the category specific selection frequency and the general selection frequency. Comparing may also include determining the difference between the category specific selection frequency and the general selection frequency. Comparing may also include determining that the difference exceeds a given threshold. Generating may also include comparing a selection value for the search result document and a total selection value aggregated across search result documents in the first category of search requester interest. The selection count for the search result may be weighted based on time between selecting the search result and at least one of a selection of successive search results and other user activity marking the end of the user engagement with the search result. Adjusting the respective scores based on the category specific score may include adjusting the respective score by multiplying and summing the category specific score and the multiplied value to the respective score. Determining a first category may include determining a second category. Determining the first category of interest may be based on search requester specific information. The search requester specific information may include demographic information and/or location information. Generating the category specific score for the search result documents may include determining an absence of the category specific score for statistically insignificant categories.

The details of one or more embodiments of the subject matter described in this specification are set forth in the accompanying drawings and the description below. Other features, objects, and advantages of the subject matter will be apparent from the description, the drawings, and the claims.

BRIEF DESCRIPTION OF DRAWINGS

Like reference symbols and designations in the various drawings indicate like elements.

DETAILED DESCRIPTION

Figure 1:
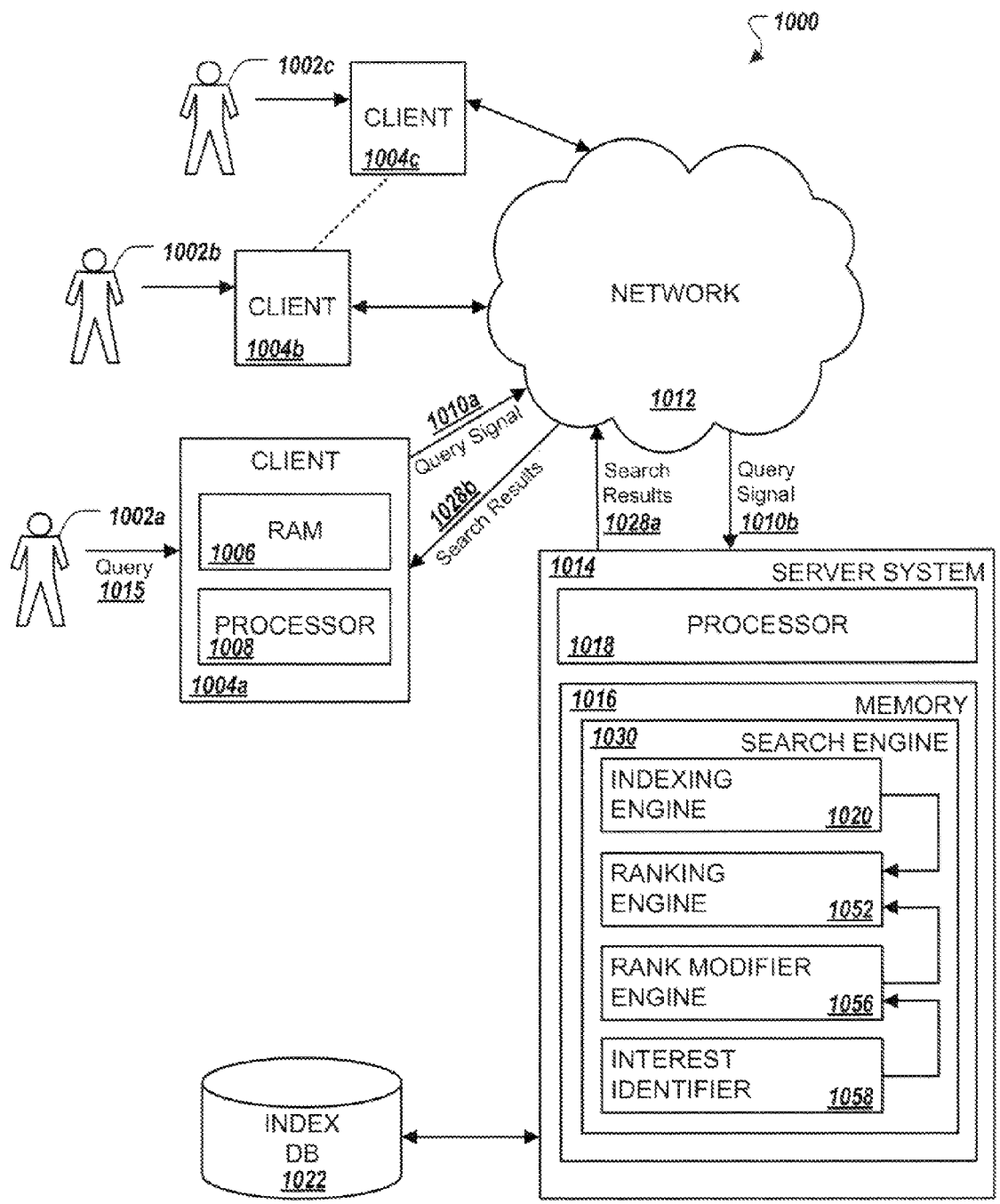
FIG. 1 shows an example information retrieval system.

FIG. 1 shows an example system 1000 for improving the relevance of results obtained from submitting search queries as can be implemented in an internet, intranet, or other client/server environment. The system 1000 is an example of an information retrieval system in which the systems, components and techniques described below can be implemented. Although several components are illustrated, there may be fewer or more components in the system 1000. Moreover, the components can be distributed on one or more computing devices connected by one or more networks or other suitable communication mediums.

A search requester 1002 (1002*a*, 1002*b*, 1002*c*) can interact with the system 1000 through a client device 1004 (1004*a*, 1004*b*, 1004*c*) or other device. For example, the client device 1004 can be a computer terminal within a local area network (LAN) or wide area network (WAN). The client device 1004 can include a random access memory (RAM) 1006 (or other memory and/or a storage device) and a processor 1008. The processor 1008 is structured to process instructions within the system 1000. In some arrangements, the processor 1008 is a single-threaded processor. In other arrangements, the processor 1008 is a multi-threaded processor. The processor 1008 can include multiple processing cores and is structured to process instructions stored in the RAM 1006 (or other memory and/or a storage device included with the client device 1004) to display graphical information for a search requester interface.

A search requester 1002*a* can connect to a search engine 1030 within a server system 1014 to submit a query 1015. When the search requester 1002*a* submits the query 1015 through an input device attached to a client device 1004*a*, a client-side query signal 1010*a* is sent into a network 1012 and is forwarded to the server system 1014 as a server-side query signal 1010*b*. Server system 1014 can be one or more server devices in one or more locations. The server system 1014 includes a memory device 1016, which can include the search engine 1030 loaded therein. A processor 1018 is structured to process instructions within the system 1014. These instructions can implement one or more components of the search engine 1030. The processor 1018 can be a single-threaded processor or a multi-threaded processor, and can include multiple processing cores. The processor 1018 can process instructions stored in the memory 1016 related to the search engine 1030 and can send information to the client device 1004, through the network 1012, to create a graphical presentation in a search requester interface of the client device 1004 (e.g., a search results web page displayed in a web browser).

The server-side query signal 1010*b* is received by the search engine 1030. The search engine 1030 uses the information within the search requester query 1015 (e.g. query terms) to find relevant documents. The search engine 1030 can include an indexing engine 1020 that actively searches a corpus (e.g., web pages on the Internet) to index the documents found in that corpus, and the index information for the documents in the corpus can be stored in an index database 1022. This index database 1022 can be accessed to identify documents related to the search requester query 1015. Note that, an electronic document (which for brevity will simply be referred to as a document) does not necessarily correspond to a file. A document can be stored in a portion of a file that holds other documents, in a single file dedicated to the document in question, or in multiple coordinated files.

The search engine 1030 can include a ranking engine 1052 to rank the documents related to the search requester query 1015. The ranking of the documents can be performed using traditional techniques for determining an information retrieval (IR) score for indexed documents in view of a given query. The relevance of a particular document with respect to a particular search term or to other provided information may be determined by any appropriate technique. For example, the general level of back-links to a document that contains matches for a search term may be used to infer a document's relevance. In particular, if a document is linked to (e.g., is the target of a hyperlink) by many other relevant documents (e.g., documents that also contain matches for the search terms) then it can be inferred that the target document is particularly relevant. This inference can be made because the authors of the pointing documents presumably point, for the most part, to other documents that are relevant to their audience.

If the pointing documents are in turn the targets of links from other relevant documents, they can be considered more relevant, and the first document can be considered particularly relevant because it is the target of relevant (or even highly relevant) documents. Such a technique may be the determinant of a document's relevance or one of multiple determinants. The technique is exemplified in some systems that treat a link from one web page to another as an indication of quality for the latter page, so that the page with the most such quality indicators is rated higher than others. Appropriate techniques can also be used to identify and eliminate attempts to cast false votes so as to artificially drive up the relevance of a page.

Various types of information may be provided to the rank modifier engine 1056 for improving the ranking of documents. For example, search requesters are often interested in one or more particular subjects or categories for a short time period, e.g., the last 30 minutes or two hours of a search session. The short-term interests of a search requestor may be identified and used to adjust ranking of search results. To determine such underlying interests of a search requester, the search engine 1030 can include an interest identifier 1058 that may implement one or more interest identification techniques. For example, the categories of interest may be gleaned from adjustments provided by the search requester. A search requester's interested in a particular category may issue queries related to the category and select search results referring to resources related to the category. A search requester may have a browsing history that indicates a particular area of interest. Generally, the search requester's recent activity can indicate the search requester's present needs and interests. In some arrangements, after an initial search request is executed and corresponding results provided, the search may be refined by the search requester to steer the subsequent search towards desired results. For example, adding or removing particular search terms and phrases during a search session may provide clues to the interests of the search requester 1002*a* (regarding the search). Similarly, the manner in which an individual interacts with search results (e.g., search selections, time spent interacting with search selections, advertisement selections, etc.) may enable the interest identifier 1058 to identify one or more categories of search requester interest. In some arrangements, an interest identifier may look at information over a recent time period. (for example, the last 30 minutes, one hour, two hours, or twenty-four hours) to determine a short-term category of user interest. In some arrangements, the search system infers that a search requester is not interested in a particular category based on the search requester's recent activity, e.g., the search requester ignores a search result referring to a resource related to the particular category, or the search requester views the resource for a very short period of time after selection of the search result.

Additional information may also be used in conjunction with the refinement information for identifying search requester interest. For example, the language of the search requester (e.g., English, Spanish, etc.), the location of the search requester (e.g., country, region, state, city, etc.) and similar information may be utilized. Once identified, data representing the identified interest may be cataloged in a database (e.g., the index db 1022). Further, the identified search requester interest may be used for various applications such as providing assistance during future search sessions performed by the search requester 1002a or other search requesters. Search result scoring and ranking (e.g., as performed by the ranking engine 1020 or the rank modifier engine 1056) can be adjusted to account for interest of the search requester 1002a or similar search requesters.

In some arrangements, the ranking engine 1052 receives one or more signals (i.e., data indicative of relevance) from a rank modifier engine 1056 to assist in determining an appropriate ranking for the resources. The rank modifier engine 1056 can provide one or more measures of category relevance for the resources, which can be used by the ranking engine 1052 to improve the ranking of resources referred to by search results 1028 provided to the search requester 1002. In some arrangements, the measure of category relevance represents a probability of search result selection given the values of one or more features, as described further below. The rank modifier engine 1056 can perform one or more of the operations described below to generate the one or more measures of category relevance.

In some arrangements, the search engine 1030 includes a scoring engine that generates scores for resources based on many different features, including content based features that indicate the relevance of resource content to the query and query independent features that generally indicate the quality of resources. The ranking engine 1052 can produce a ranking of resources based on scores received from the scoring engine and one or more measures of category relevance from the rank modifier engine 1056.

The search engine 1030 can forward the final, ranked result list within a server-side search results signal 1028a through the network 1012. Exiting the network 1012, a client-side search results signal 1028b can be received by the client device 1004a where the results can be stored within the RAM 1006 and/or used by the processor 1008 to display the results on an output device for the search requester 1002a.

Figure 2:
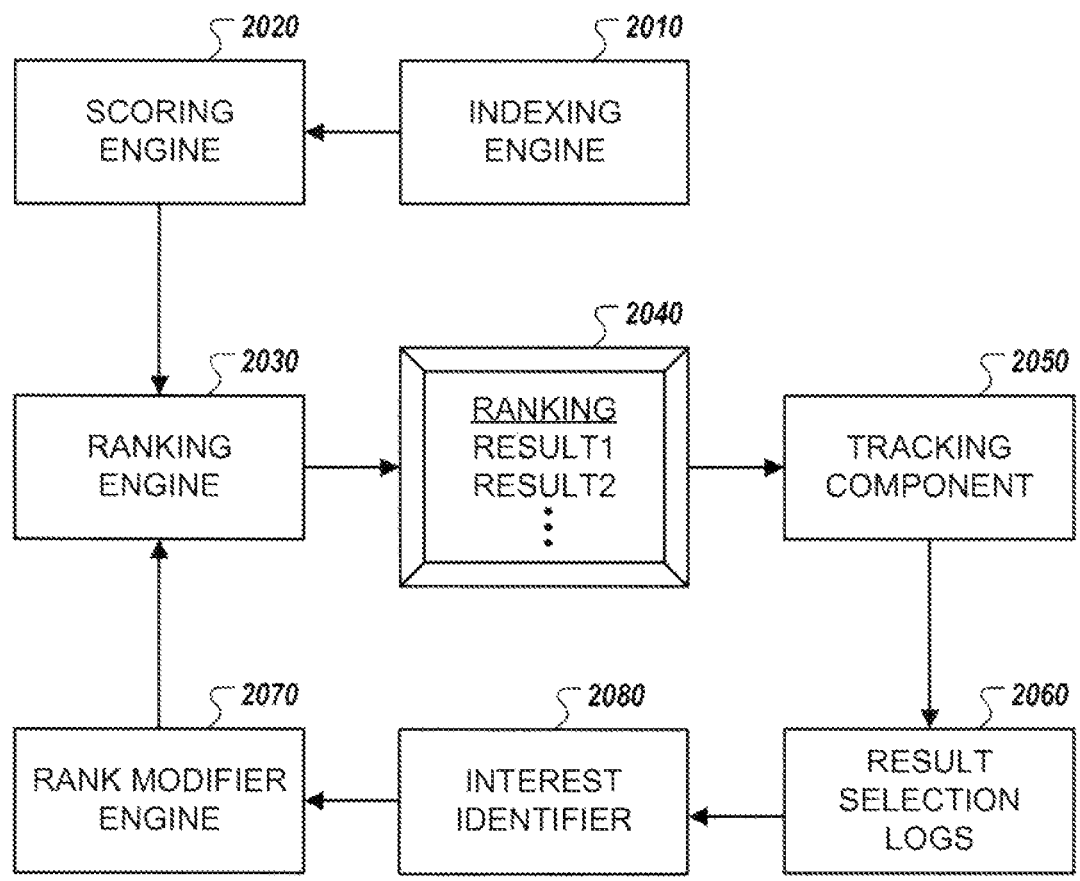
FIG. 2 shows example components of an information retrieval system.

FIG. 2 shows example components of an information retrieval system. These components can include an indexing engine 2010, a scoring engine 2020, a ranking engine 2030, a rank modifier engine 2070, and an interest identifier 2080. The indexing engine 2010 can function as described above for the indexing engine 1020. In addition, the scoring engine 2020 can generate scores of document results based on many different features, including content-based features that link a query to document results, and query-independent features that generally indicate the quality of document results. The content-based features can include aspects of document format, such as query matches to title or anchor text in an HTML (Hyper Text Markup Language) page. The query-independent features can include aspects of document cross-referencing, such as a rank of the document or the domain. Moreover, the particular functions used by the scoring engine 2020 can be tuned to adjust the various feature contributions to the final IR score using automatic or semi-automatic processes.

The ranking engine 2030 can produce a ranking of document results 2040 for display to a search requester based on IR scores received from the scoring engine 2020 and one or more signals from the rank modifier engine 2070. The rank modifier engine 2070 can adjust rankings, at least in part, based on data received from the interest identifier 2080. Along with being provided data from the result selection logs 2060, other sources may provide information to the interest identifier 2080. For example, queries entered into a search requester interface may be provided to the interest identifier 2080. The interest identifier 2080 may provide information about the relevance of particular search results for a category of interest and a query to the rank modifier engine 2070. In this particular example, the interest identifier 2080 provides information to the rank modifier engine 2070, however other architectures may be implemented. For example, a category of interest information may be provided by the interest identifier 2080 to the indexing engine 2010 or one or more other components of the information retrieval system. A tracking component 2050 can be used to record information regarding individual search requester selections of the results presented in the ranking 2040. For example, the tracking component 2050 can be embedded JavaScript code included in a web page ranking 2040 that identifies search requester selections (clicks) of individual document results and also identifies when the search requester returns to the results page. Therefore the component may indicate the amount of time the search requester spent viewing the selected document result. In other arrangements, the tracking component 2050 can be a proxy system through which search requester selections of the document results are routed, or the tracking component can include pre-installed software at the client (e.g., a toolbar plug-in to the client's operating system). Other arrangements are also possible, such as using a feature of a web browser that allows a tag/directive to be included in a page, which requests the browser to connect back to the server with message(s) regarding link(s) clicked by the search requester.

The recorded information can be stored in result selection log(s) 2060. The recorded information can include log entries that indicate, for each search requester selection, the query, the resource, the time on the resource, the language employed by the search requester, and the country or region where the search requester is likely located (e.g., based on the server used to access the IR system). Other information can also be recorded regarding search requester interactions with a presented ranking, including negative information, such as the fact that a document result was presented to a search requester but was not clicked, position(s) of click(s) in the search requester interface, IR scores of clicked results, IR scores of all results shown before the clicked result, the titles and snippets shown to the search requester before the clicked result, the search requester's cookie, cookie age, IP (Internet Protocol) address, search requester agent of the browser, etc. Still, further information can be recorded such as described below during discussion of the various features that can be used to build a prior model. Moreover, similar information (e.g., IR scores, position, etc.) can be recorded for an entire session, or multiple sessions of a search requester, including potentially recording such information for every click that occurs both before and after a current click.

The information stored in the result selection log(s) 2060 can be used by one or more components of the information retrieval system. For example, information could be provided to interest identifier 2080 and the rank modifier engine 2070 in generating one or more signals to the ranking engine 2030. In general, a wide range of information can be collected and used to modify or tune the click signal from the search requester to make the signal, and the future search results provided, a better fit for the search requester's needs. Thus, search requester interactions with the rankings presented to the search requesters of the information retrieval system can be used to improve future rankings Additionally, query adjustments indicative of refining a search can be used to modify rankings. In some arrangements, the search requester interaction and search requester interest data may be provided to one or more server systems (e.g., server system 1014) for use and storage (e.g., database 1022) for later retrieval. For example, interest identifier 2080 may compare current search results with previous search activity to provide ranking adjustments to the rank modifier engine 2070.

The components shown in FIG. 2 can be combined in various manners and implemented in various system configurations. For example, the scoring engine 2020 and the ranking engine 2030 can be merged into a single ranking engine, such as the ranking engine 1052 of FIG. 1. The interest identifier 2080, the rank modifier engine 2070, and the ranking engine 2030 can also be merged and, in general, a ranking engine includes any software component that generates a ranking of document results after a query. Moreover, a ranking engine can be included in a client system in addition to (or rather than) in a server system.

Figure 3:
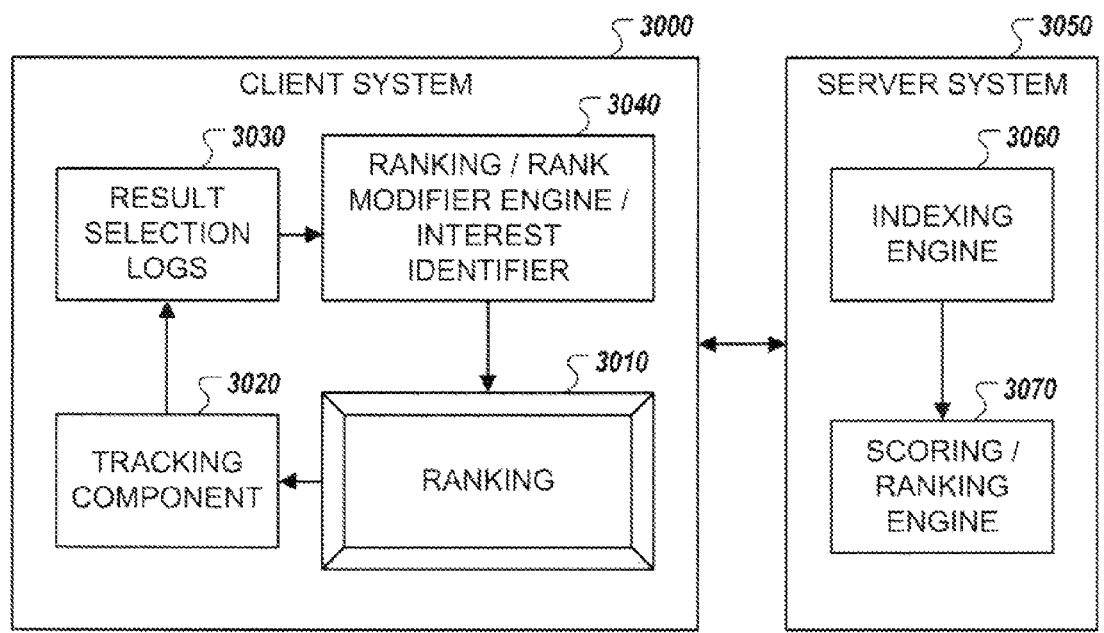
FIG. 3 shows another example information retrieval system.

FIG. 3 shows another example of an information retrieval system. In this system, a server system 3050 includes an indexing engine 3060 and a scoring/ranking engine 3070. A client system 3000 includes a search requester interface for presenting a ranking 3010, a tracking component 3020, result selection log(s) 3030 and a ranking/rank modifier engine/interest identifier 3040. For example, the client system 3000 can include a company's enterprise network and personal computers, in which a browser plug-in incorporates the ranking/rank modifier engine/intent identifier 3040. When an employee in the company initiates a search on the server system 3050, the scoring/ranking engine 3070 can return the search results along with either an initial ranking or the actual IR scores for the results. The browser plug-in can then re-rank the results locally based on tracked page selections for the company-specific search requester base. While FIGS. 2 and 3 provide two exemplary information retrieval systems, other architectures may be implemented. For example, an indent identifier may be positioned in other locations of an information retrieval system or distributed across multiple locations.

Referring to FIG. 1, the search system 1014 can modify the IR score of a resource for a particular searcher based on the searcher's inferred short-term categorical interests. In particular, for a given query issued by a particular searcher with inferred categorical interests, the search system 1014 can refer to the search result selections of other searchers who issued the same query or similar queries and were interested in the same categories. The search system 1014 can increase the IR scores of the resources associated with the search results that were preferred by these similarly interested search requesters. Likewise, the search system 1014 can decrease the IR scores of the resources associated with the search results that were ignored or not preferred by these similarly interested search requesters. Preference for a search result can be inferred in a number of ways, e.g., from a high rate of search requester selection of the search result or long views of the associated resource by search requesters selecting the search result.

When the score of a resource increases or decreases, the rank of the resource relative to other responsive resources may be increased or decreased. Whether the rank of a particular resource changes depends on the rank of the resource before modifying the score, how much the score is modified, and how much the score for neighboring resources are modified. For example, if the ranking engine 1052 has already ranked a particular resource as the top resource for a given query, increasing the score for that particular resource will not change the resource's rank. However, if the search system increases the score for the second-ranked resource for the given query, the amount increased might be large enough to boost the second-ranked resource to the top spot. Thus, the search system can promote or demote resources in a search results list for a particular search requester based on the search requester's inferred short-term categorical interests.

In some arrangements, the search system 1014 only modifies the score of a resource for a particular search requester issuing a given query if similarly interested search requesters selected the search result referring to the resource at a rate that differs (e.g., by a statistically significant amount) from the rate at which the general population selected the same search result returned for the same query. The required threshold to determine that the result is selected more often for search requesters with a specific interest than by search requesters with a more general interested may be a fixed threshold (for example a difference of at least 0.01 in absolute click through rate). The required threshold may be relative, for example, the click through rate may need to be at least 10% greater. For example, if a result receives a click through rate of 10% among the general population, and a click through rate of 12% among search requesters having a particular interest, the relative difference is 20%. The threshold may also be statistical. For example, if the click through rate based on a sample observation period for a given result is more than a standard deviation greater for users having a particular interest than for the general population. In some arrangements the threshold may be a combination of absolute, relative, and/or statistical thresholds.

The search system 1014 can use the rate at which search requesters select a particular search result for a given query as a measure of the relevance of the associated resource to the given query. For example, if search requesters with an identified interest select a search result more frequently then the general population, the search system can infer that other similarly interested search requesters will find the search result to be more relevant. Likewise, if search requesters with an identified interest select a search result less frequently than the general population, the search system can infer that other similarly interested search requesters will find the associated resource to be less relevant.

In some arrangements, the difference between the two rates must be greater than a predefined threshold for the search system to modify the resource's score. If the difference is greater than the predefined threshold, the search system modifies the score of the resource to reflect the measure of category relevance (e.g., the expected selection rate) of the resource to the given query for the similarly interested search requesters.

Figure 4A:
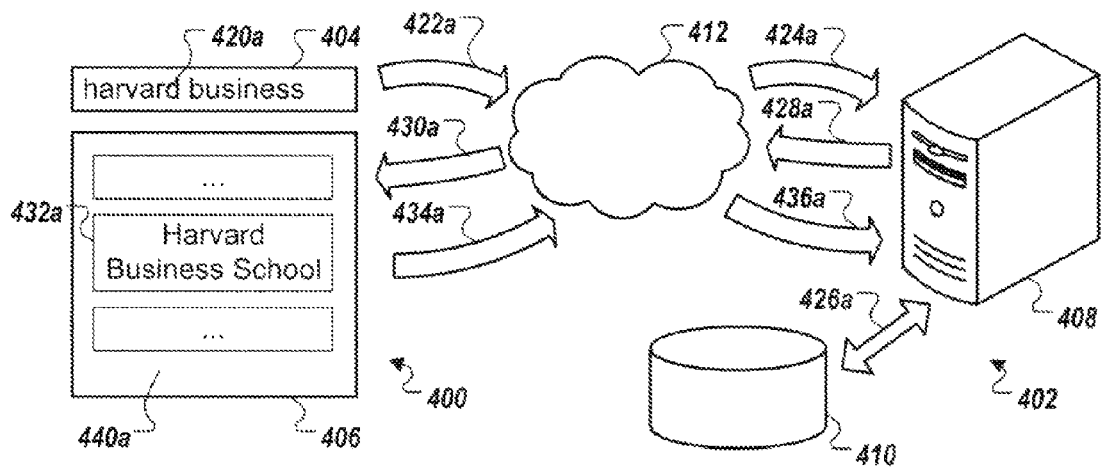
FIGS. 4A, 4B and 4C illustrate an information retrieval search session.

For example, referring to FIG. 4A, a search requester may be researching business schools during a particular period. During this period, the search requester issues the query "harvard business" 420*a* in the query interface 404. As shown by process arrows 422*a* and 424*a*, the search query 420*a* and characteristics associated with the user (e.g. language, location, etc.) may be sent to the server side system 402 via the network 412. The server side system 402 can process the search query 420*a* and related information, for example by using one or more software modules (e.g., a search engine) executed by the server 408. As shown by process arrow 426*a*, the "harvard business" query 420*a* may be stored in the data store 410. Other information (e.g., index information, user characteristics, search session statistics, etc.) may also be retrieved from or stored in the data store 410 and can be used by the server 408 for providing a set of query results. The data store 410 is representative of various types of information sources that may be in communication with the server 408. For example, one or more storage devices (e.g., hard drives, etc.), servers, and computing device equipment may be directly or indirectly (e.g., via one or more networks) in communication with the server 408. As shown by process arrows 428a and 430a, search results may be sent to the client side system 400 via the network 412. Upon receipt, a set of search results 440a may be presented to a user via the results interface 406. In this example, the search requester selects the "Harvard Business School" search result 432, referring to the Harvard Business School web site. As shown by process arrows 434a and 436a, information about the selection is sent to the server side system 402 and stored in the database 410.

Figure 4B:
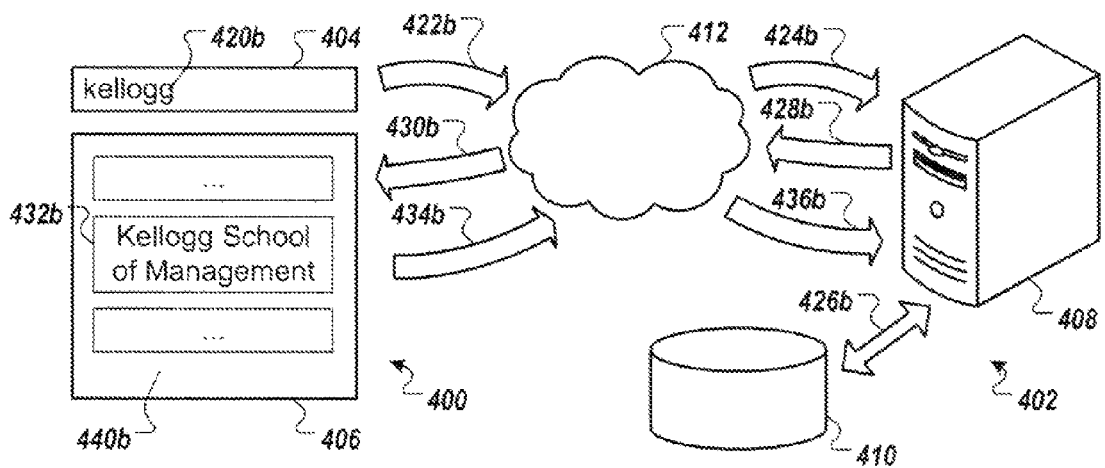

Referring to FIG. 4B, during the same period, the same search requester issues a query "kellogg" 420b in the query interface 404. As shown by process arrows 424b and 424b, the search query 420b and characteristics associated with the user may be sent to the server side system 402 via the network 412. The server side system 402 may process the search query 420a and related information. As shown by process arrow 426a, the query "kellogg" 430b may be stored in the data store 410. Other data may be retrieved from or stored in the data store 410, including information about the previously submitted query 420a and the previously selected result 432a. In this example, the server 408 determines that there is insufficient data to support an inference of a category of interest. In other examples, the previously submitted query 420a, the search results returned from executing the query, and/or the previously selected result 432a alone, or coupled with the user information, may be sufficient for the server 408 to infer a category of user interest. As shown by process arrows 428b and 430b, search results may be sent to the client side system 400 via the network 412. Upon receipt, a set of search results 440b may be presented to a user via the results interface 406. In this example, the search requester selects the "Kellogg School of Management" search result 432b referring to the website of the Kellogg School of Management at Northwestern. As shown by process arrows 434b and 436b, information about the selection is sent to the server side system 402 and stored in the database 410.

Figure 4C:
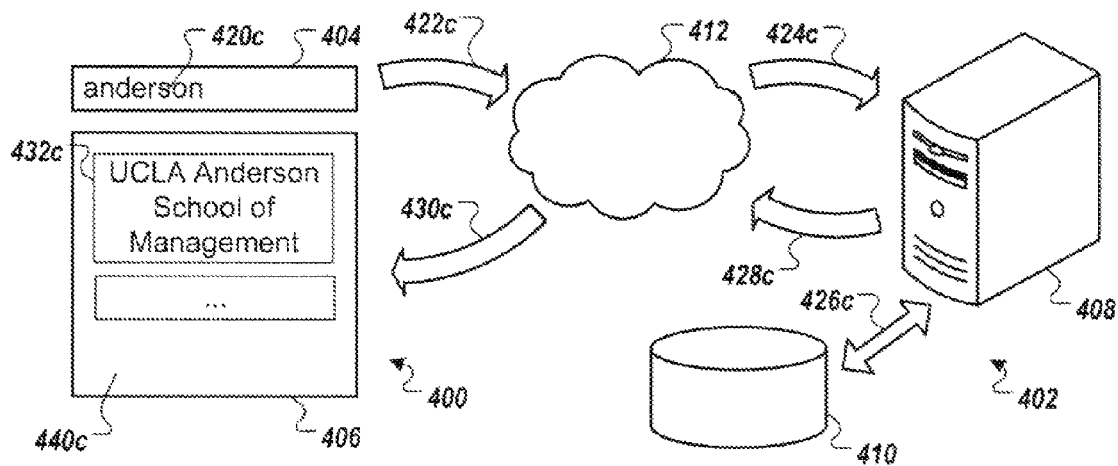

Referring to FIG. 4C, also during the same period, the same search requester then issues a query "anderson" 420c in the query interface 404. As shown by process arrows 424c and 424c, the search query 420c and characteristics associated with the user may be sent to the server side system 402 via the network 412. The server side system 402 can process the search query 420c and related information. As shown by process arrow 426c, data may be retrieved from or stored in the data store 410, including information about the previously submitted queries 420a, 420b and the previously selected results 432a, 432b. The server 408, infers from the available data that the search requester has an interest in "business schools." The server 408 computes or retrieves previously computed selection statistics for the search results returned for the query "anderson" 420c for both search requesters of the general population and search requesters with an inferred interest in "business schools." The selection statistics might indicate that search requesters interested in "business schools" selected the UCLA Anderson School of Management search result 432c at a higher rate (e.g., 87%) than the rate (e.g., 2.7%) at which search requesters of the general population selected this search result returned for the query "anderson." If the difference in the two rates exceeds a predefined threshold, the server 408 may increase the score for the UCLA Anderson School of Management web site for this search requester, where the increase reflects the higher measure of category relevance of this resource for similarly interested search requesters. As shown by process arrows 428c and 430c, search results may be sent to the client side system 400 via the network 412. Upon receipt, a set of search results 440c may be presented to a user via the results interface 406. As a result of the increase, the UCLA Anderson School of Management search result 432c may appear higher on the list of search results returned for the query "anderson"420c for this particular search requester relative to the search result's position on the list of search results returned for the query for search requesters of the general population.

Figure 5:
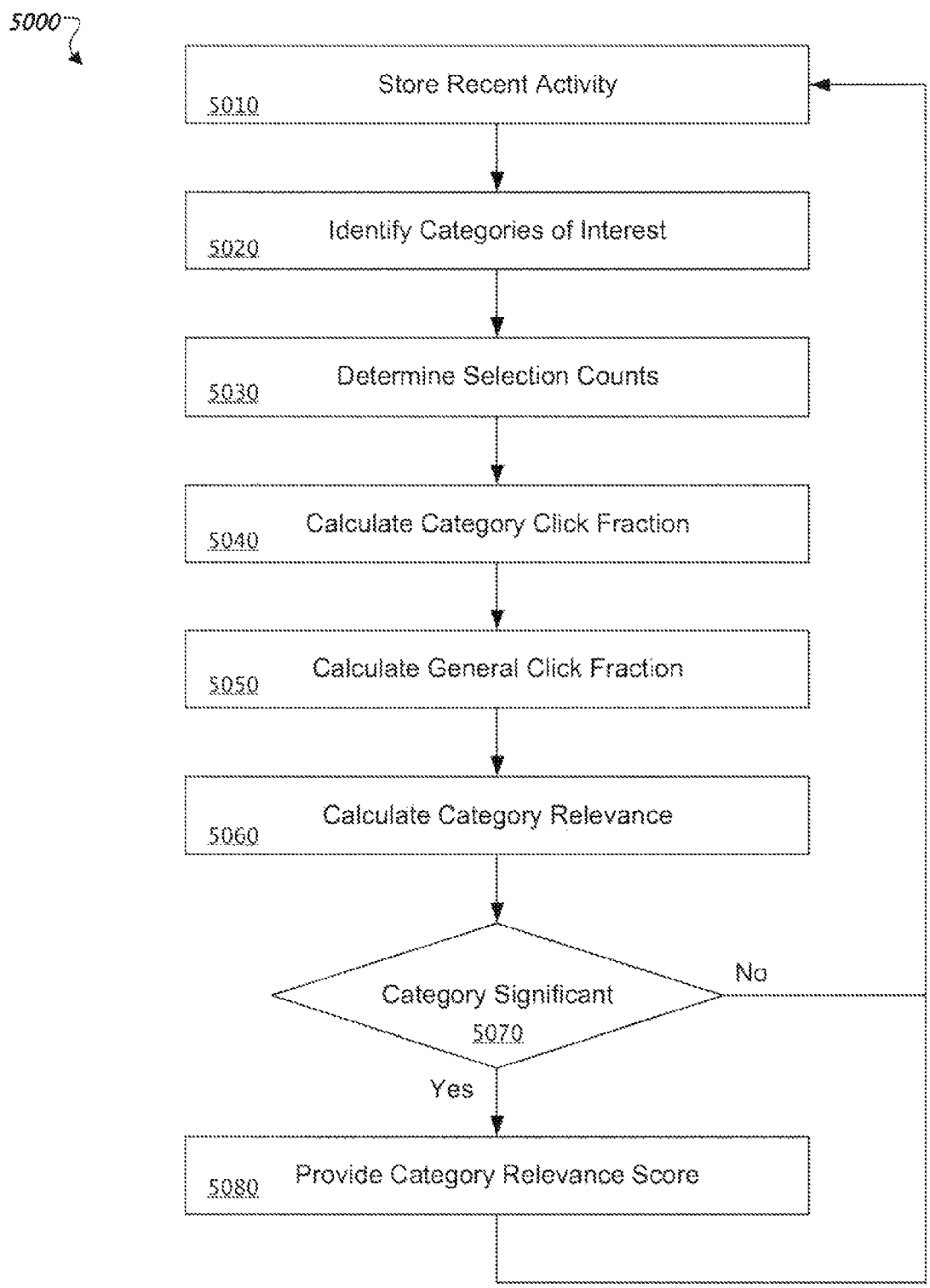
FIG. 5 shows a flowchart of operations of an interest identifier.

Referring to FIG. 5, a flow chart 5000 represents a particular arrangement of operations of the interest identifier (FIG. 1, 1058). Typically the operations are executed by one or more processors of a computer system upon which the interest identifier is resident. While typically executed by a single electronic device, in some arrangements operation execution may be distributed among two or more electronic devices (for example, computer systems).

Operations include storing recent activity 5010. In some arrangements recent activity may be stored by the interest identifier 1058 directly. In other arrangements, another component of the server system 1014 may store the recent activity for later use by the interest identifier 1058. In one example, a search requester's browing history may be stored. In another example, a search requester's interactions with the search system are stored. Their interaction may include queries submitted by a search requester and information descriptive of a search requester's interactions with the provided search results. For example, a search requester may select a particular resource and perform some action which indicates the search requester in finished with the resource, such as selecting another result, entering a new query, or leaving the search page or selecting another result. The selected results may be stored along with a measure of the passage of time between the selection and the subsequent action. As another example, a search requester may submit a query and subsequently submit a second query which further refines the query. In another arrangement, information about the particular search requester may also be stored. For example, the system may store location, demographic, and linguistic information.

Operations also include identifying categories of interest 5020. In one example, the system may use the stored activity to identify categories of interest. In some arrangements the system may examine a search requester's interactions with the system to determine a category of interest. This may include analyzing patterns of query submission and result selection to infer a category. In some arrangements, the short term categorical interests are identified using a technique for classifying text (e.g., query terms or text in resources) into fine grained hierarchical categories. A hierarchical category may consist of a series of progressively narrower categories in a parent/child relationship, for example, a "sports" category may have a "football" child category, which in turn may have "high school football" and "professional football" child categories. Generally, the depth of the hierarchy defines the level of refinement. In some arrangements a search requester's category of interest may be defined at any level of the hierarchy. For example, a search requester may be determined to be interested in the "high school football" or a search requester may be determined to be interested in "sports." In other arrangements, a category of interest may only be defined at the narrowest level subcategory, for example, "high school football". In some arrangements, a determined interest in a parent category (for example, "football") indicates interest in all child categories for that parent (for example, "professional football" and "high school football"). In other arrangements, interest in a parent category indicates only a general interest and does not indicate interest in the child categories, for example, an interest in "sports" may not indicate an interest in "football" or "high school football."

In some arrangements, categories are formed by comparing a search requesters queries with the search results the search requester selects. For example, for the search requester submissions of query "professional football" a search engine may present a URL pointing to document to the search requester a number of times. If a search requester clicks on the URL, the click can be considered a confirmation that document is a valid search result for query. In this manner, categories of interest may be formed based on the queries and the search requester's selections. In some arrangements, queries which produce similar results or similar selected results may be determined to refer to the same category of interest.

Operations also include determining selection counts 5030. In one example, determining selection counts may include calculating the number of times a resource is selected by a search requester executing a particular query and having a particular category of interest. The results of this process may be stored for later access. In some arrangements, selection counts are further refined based on the location, demographic or linguistic information.

In some arrangements, the selection count may be weighted based on the time between a search requester selects the respective resource and when the search requester indicates that the requester is finished with the respective source. In some arrangements, the selection of a subsequent resource by a search requester indicates that the requester is finished with the first resource. For example, if a search requester selects the resource referring to a particular resource and views that resource for a long period of time before selecting a different resource, the selection count may be increased by an amount proportional to how long the requester waited before selecting the different resource. In some arrangements submitting a new query may indicate that a search requester is finished with the first resource. In still other arrangements, a search requester may indicate that the search requester is finished with a particular resource by not returning to the search results.

Operations also include calculating a category click-fraction 5040. In one example, the category click-fraction may be calculated for each resource selected for a particular query and category of interest. The category click-fraction may be a measure of the selection count for a particular resource as a percentage of the combined selection count for all resources for the query and category of interest.

Operations also include calculating a general click fraction 5050. In one example, the general click fraction may be a measure of the selection count for a particular resource as a percentage of the combined selection count for all resources for the query independent of any category of interest.

Operations also include calculating category relevance 5060. In one example, the category relevance may be a measure of the difference between category click fraction and the general click fraction. The difference may be determined in either absolute or relative terms.

Operations also include determining if the category is significant 5070. In one example, the significance of the category may be determined based on the category relevance, the category click fraction, and the general click fraction. In one arrangement, the category may be significant if the category relevance exceeds a certain threshold. In another example, the category may be significant if the difference between the category click fraction and the general click fraction is statistically significant. In other arrangements, a category may be insignificant, regardless of any click fraction, if an aggregated selection count for all queries and resources is less than a predefined threshold.

Operations also include providing a category relevance score 5080. In one example, the category relevance score may be determined based on the category relevance. In one arrangement, the category relevance score may be determined by multiplying the category relevance by a constant value. The category relevance score may be provided to a ranking engine and stored for later use.

In some arrangements, the interest identifier 1058 may execute the process 5000 in batch. The interest identifier 1058 may cache the measures of category relevance for quick retrieval. The interest identifier 1058 may modify the score of resources matching a given query for a particular search requester as soon as the system infers one or more categories of interests for the search requester. The interest identifier 1058 may also cache other scoring information, for example, measures of category relevance, general click fractions or category click fractions.

Figure 6:
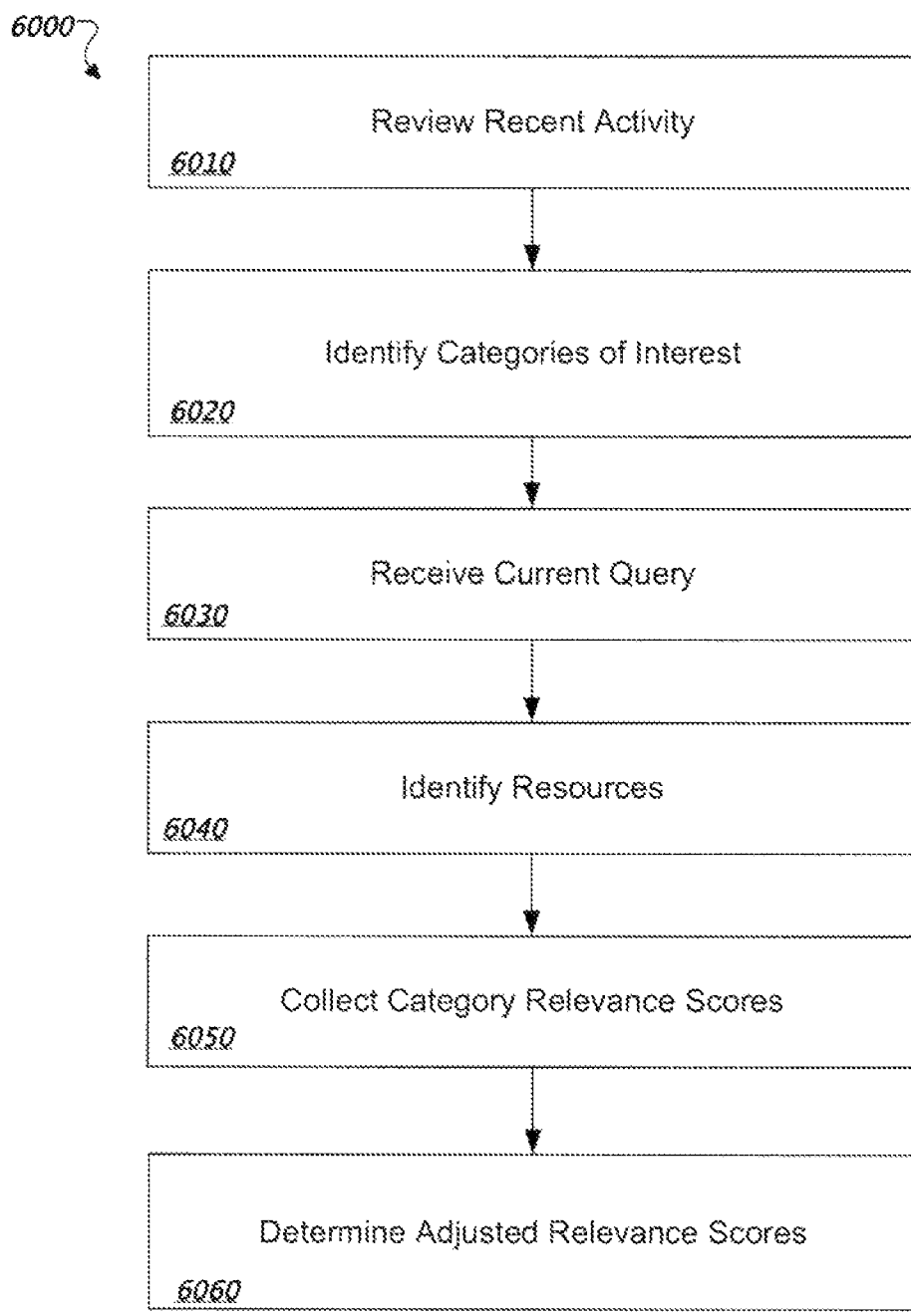
FIG. 6 shows a flowchart of operations of a search system.

Referring to FIG. 6, a flowchart 6000 represents a particular arrangement of operations of the interest identifier (FIG. 1, 1058). Typically the operations are executed by one or more processors of a computer system upon which the search system is resident. While typically executed by a single electronic device, in some arrangements, operation execution may be distributed among two or more electronic devices (for example, computer systems).

Operations include reviewing recent activity 6010. In one example, the interest identifier 1058 reviews the recent activity of a search requester. The recent activity can be queries issued and the resources selected within a short time period, e.g., during the last 30 minutes, two hours, or 24 hours of a search session. Recent activity can also or alternatively be defined as a sequence of queries and interactions with resources with no interruption of more than a predetermined amount of time. Recent activity can also be determined in terms of the current task. In some arrangements, the end of the task may be identified when the current queries are no longer consistent with the previously identified category of interest.

Operations also include identifying categories of interest 6020. The interest identifier 1058 may identify at least one category of interest for the search requester based on the search requester's recent activity. The system can identify the categories using the technique used in process 5000 described above. In some arrangements, the category of interest is further identified using location, demographic, and linguistic information of the search requester.

Operations also include receiving a current query 6030. In one example, the interest identifier 1058 receives a new query issued by the search requester.

Operations also include identifying resources 6040. In one example, the interest identifier 1058 identifies multiple resources matching the search requester's current query. Each resource is provided with a IR score which measures the general relevance of the resource to the current query. In some arrangements, resources matching particular popular queries are predetermined and cached. If available the system retrieves a list of the cached resources and their scores.

Operations also include collecting category relevance scores 6050. In one example, the interest identifier 1058 retrieves category relevance scores for each resource matching the search requester's current query based on the category of interest.

Operations also include determining adjusted relevance scores 6060. While this operation may be performed by the interest identifier 1058, it is typically performed by the ranking engine 1052. In one example, the ranking engine 1052 adjusts IR scores based on the category relevance score provided by the interest identifier 1058. In one arrangement, the adjusted relevance score is determined by summing the IR score and the category relevance score. In other arrangements, the adjusted score is determined by multiplying the IR score and the category relevance score.

In some arrangements, the relevance score of a resource may have been previously adjusted based on other characteristics of the search requester independent of any category of interest. For example, a relevance score may be adjusted based on the search requester's location, linguistic, and demographic information. The interest identifier 1058 may further adjust the relevance score of the resource by applying an adjustment that replaces the previous adjustments and accounts for both the characteristics of the search requester and categories of interest.

In some arrangements, the interest identifier 1058 may identify multiple categories of interest for the search requester. The interest identifier 1058 then determines a category relevance score for each category of interest. The final category relevance score reflects a combination of the relevance of the multiple categories. In some arrangements, the category relevance score for multiple categories may be based on summing the click fractions for each category. In other arrangements, the category relevance score may be based on the sum of all the category relevance scores. In other arrangements, the category relevance for multiple categories may be based on the multiplication of each category click fraction.

Figure 7:
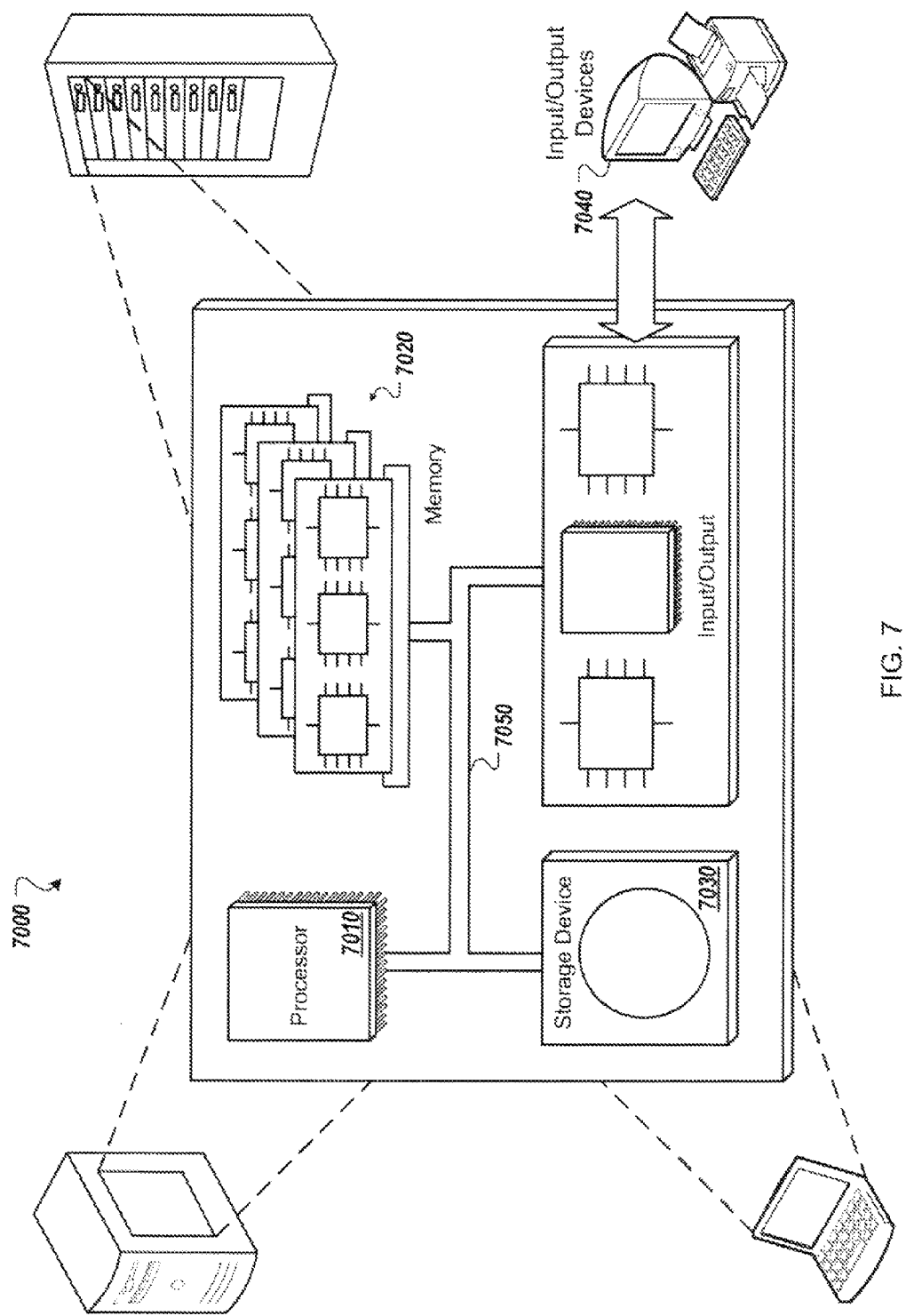
FIG. 7 shows a schematic diagram of an example computer system.

FIG. 7 is a schematic diagram of an example computer system 7000. The system 7000 can be used for practicing operations described above. The system 7000 can include a processor 7010, a memory 7020, a storage device 7030, and input/output devices 7040. Each of the components 7010, 7020, 7030, and 7040 are interconnected using a system bus 7050. The processor 7010 is capable of processing instructions within the system 7000. These instructions can implement one or more aspects of the systems, components and techniques described above. In some implementations, the processor 7010 is a single-threaded processor. In other implementations, the processor 7010 is a multi-threaded processor. The processor 7010 can include multiple processing cores and is capable of processing instructions stored in the memory 7020 or on the storage device 7030 to display graphical information for a user interface on the input/output device 7040.

The memory 7020 is a computer readable medium such as volatile or non volatile that stores information within the system 7000. The memory 7020 can store processes related to the functionality of the search engine 1030 (shown in FIG. 1). The storage device 7030 is capable of providing persistent storage for the system 7000. The storage device 7030 can include a floppy disk device, a hard disk device, an optical disk device, a tape device, or other suitable persistent storage mediums. The storage device 7030 can store the various databases described above. The input/output device 7040 provides input/output operations for the system 7000. The input/output device 7040 can include a keyboard, a pointing device, and a display unit for displaying graphical user interfaces.

The computer system shown in FIG. 7 is but one example. In general, embodiments of the subject matter and the functional operations described in this specification can be implemented in digital electronic circuitry or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. For example, feedback provided to the user can be any form of sensory feedback, e.g., visual feedback, auditory feedback, or tactile feedback, and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases, be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain arrangements, multitasking and parallel processing may be advantageous. In some arrangements, the search system uses a search requester's inferred short-term categorical interests to identify resources that match the search requester's present query.

What is claimed is:

1. A method performed by a data processing apparatus, the method comprising:
   identifying, for a user that submitted a query, a short-term category of interest;
   identifying, based on the query, a search result that has an associated category selection value and a general selection value, wherein:
      the category selection value is based on a count of selections of the search result as a portion of combined selection counts for search results responsive to the query for one or more users classified as having the short-term category of interest; and
      the general selection value is based on a count of selections of the search result as a portion of combined selection counts for search results responsive to the query for a plurality of users for multiple categories of interest;
   determining, based on a difference between the category selection value and the general selection value satisfying a threshold value, to adjust a ranking score for the search result;
   adjusting the ranking score for the search result in response to determining to adjust the ranking score for the search result; and
   ranking the search result with other search results for the query based on the adjusted ranking score.

2. The method of claim 1, wherein the short-term category of interest is based on at least one of search activity of the user or web browsing history of the user.

3. The method of claim 1, wherein:
   the ranking score comprises an information retrieval score for a resource referenced by the search result; and
   adjusting the ranking score comprises combining the information retrieval score with the difference between the category selection value and the general selection value.

4. The method of claim 1, wherein ranking the search result with other search results comprises:
   identifying other users that are determined to be similar to the user;
   determining that at least a portion of the other users have selected the search result; and
   adjusting the ranking of the search result in response to determining that at least a portion of the other users have selected the search result.

5. A method performed by a data processing apparatus, the method comprising:
   identifying, for a user that submitted a query, a short-term category of interest;
   identifying, based on the query, a search result that has an associated category selection value and a general selection value, wherein:
      the category selection value is based on a count of selections of the search result as a portion of combined selection counts for search results responsive to the query for one or more users classified as having the short-term category of interest; and the general selection value is based on a count of selections of the search result as a portion of combined selection counts for search results responsive to the query for a plurality of users for multiple categories of interest;

identifying a ranking score for the search result, the ranking score comprising an information retrieval score for a resource referenced by the search result;

determining to adjust the ranking score for the search result based on a difference between the category selection value and the general selection value;

adjusting the ranking score for the search result in response to determining to adjust the ranking score for the search result, wherein adjusting the ranking score comprises combining the information retrieval score with the difference between the category selection value and the general selection value, including multiplying the information retrieval score by the difference between the category selection value and the general selection value; and ranking the search result based on the adjusted ranking score.

6. A system comprising:

a data processing apparatus; and a memory apparatus in data communication with the data processing apparatus and storing instructions executable by the data processing apparatus and that upon such execution cause the data processing apparatus to perform operations comprising:

identifying, for a user that submitted a query, a short-term category of interest;

identifying, based on the query, a search result that has an associated category selection value and a general selection value, wherein:

the category selection value is based on a count of selections of the search result as a portion of combined selection counts for search results responsive to the query for one or more users classified as having the short-term category of interest; and the general selection value is based on a count of selections of the search result as a portion of combined selection counts for search results responsive to the query for a plurality of users for multiple categories of interest;

determining, based on a difference between the category selection value and the general selection value satisfying a threshold value, to adjust a ranking score for the search result;

adjusting the ranking score for the search result in response to determining to adjust the ranking score for the search result; and ranking the search result with other search results for the query based on the adjusted ranking score.

7. The system of claim 6, wherein the short-term category of interest is based on at least one of search activity of the user or web browsing history of the user.

8. The system of claim 6, wherein:

the ranking score comprises an information retrieval score for a resource referenced by the search result; and adjusting the ranking score comprises combining the information retrieval score with the difference between the category selection value and the general selection value.

9. The system of claim 6, wherein ranking the search result with other search results comprises:

identifying other users that are determined to be similar to the user;

determining that at least a portion of the other users have selected the search result; and adjusting the ranking of the search result in response to determining that at least a portion of the other users have selected the search result.

10. A system comprising:

a data processing apparatus; and a memory apparatus in data communication with the data processing apparatus and storing instructions executable by the data processing apparatus and that upon such execution cause the data processing apparatus to perform operations comprising:

identifying, for a user that submitted a query, a short-term category of interest;

identifying, based on the query, a search result that has an associated category selection value and a general selection value, wherein:

the category selection value is based on a count of selections of the search result as a portion of combined selection counts for search results responsive to the query for one or more users classified as having the short-term category of interest; and the general selection value is based on a count of selections of the search result as a portion of combined selection counts for search results responsive to the query for a plurality of users for multiple categories of interest;

identifying a ranking score for the search result, the ranking score comprising an information retrieval score for a resource referenced by the search result;

determining to adjust the ranking score for the search result based on a difference between the category selection value and the general selection value;

adjusting the ranking score for the search result in response to determining to adjust the ranking score for the search result, wherein adjusting the ranking score comprises combining the information retrieval score with the difference between the category selection value and the general selection value, including multiplying the information retrieval score by the difference between the category selection value and the general selection value; and ranking the search result based on the adjusted ranking score.

11. A non-transitory computer storage medium encoded with a computer program, the program comprising instructions that when executed by data processing apparatus cause the data processing apparatus to perform operations comprising:

identifying, for a user that submitted a query, a short-term category of interest;

identifying, based on the query, a search result that has an associated category selection value and a general selection value, wherein:

the category selection value is based on a count of selections of the search result as a portion of combined selection counts for search results responsive to the query for one or more users classified as having the short-term category of interest; and the general selection value is based on a count of selections of the search result as a portion of combined selection counts for search results responsive to the query for a plurality of users for multiple categories of interest;

determining, based on a difference between the category selection value and the general selection value satisfying a threshold value, to adjust a ranking score for the search result;

adjusting the ranking score for the search result in response to determining to adjust the ranking score for the search result; and ranking the search result with other search results for the query based on the adjusted ranking score.

12. The non-transitory computer storage medium of claim 11, wherein the short-term category of interest is based on at least one of search activity of the user or web browsing history of the user.

13. The non-transitory computer storage medium of claim 11, wherein:
the ranking score comprises an information retrieval score for a resource referenced by the search result; and
adjusting the ranking score comprises combining the information retrieval score with the difference between the category selection value and the general selection value.

14. The non-transitory computer storage medium of claim 11, wherein ranking the search result with other search results comprises:
identifying other users that are determined to be similar to the user;
determining that at least a portion of the other users have selected the search result; and
adjusting the ranking of the search result in response to determining that at least a portion of the other users have selected the search result.

15. A non-transitory computer storage medium encoded with a computer program, the program comprising instructions that when executed by data processing apparatus cause the data processing apparatus to perform operations comprising:

identifying, for a user that submitted a query, a short-term category of interest;

identifying, based on the query, a search result that has an associated category selection value and a general selection value, wherein:
the category selection value is based on a count of selections of the search result as a portion of combined selection counts for search results responsive to the query for one or more users classified as having the short-term category of interest; and
the general selection value is based on a count of selections of the search result as a portion of combined selection counts for search results responsive to the query for a plurality of users for multiple categories of interest;

identifying a ranking score for the search result, the ranking score comprising an information retrieval score for a resource referenced by the search result;

determining to adjust the ranking score for the search result based on a difference between the category selection value and the general selection value;

adjusting the ranking score for the search result in response to determining to adjust the ranking score for the search result, wherein adjusting the ranking score comprises combining the information retrieval score with the difference between the category selection value and the general selection value, including multiplying the information retrieval score by the difference between the category selection value and the general selection value; and ranking the search result based on the adjusted ranking score.

* * * * *